Nov. 26, 1963  V. R. CAMPBELL  3,112,131
SELF-FLARING TUBE COUPLING
Filed Oct. 10, 1960  2 Sheets-Sheet 1
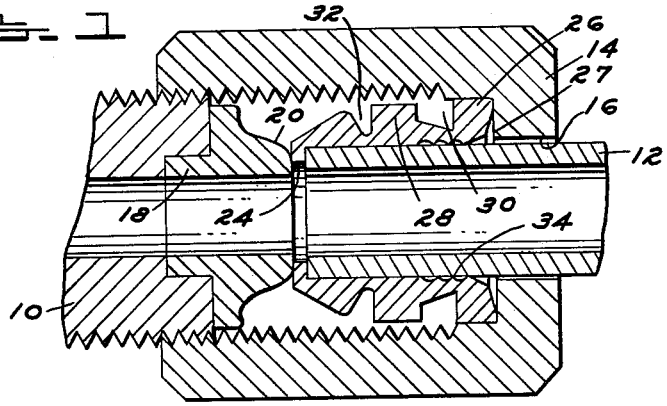
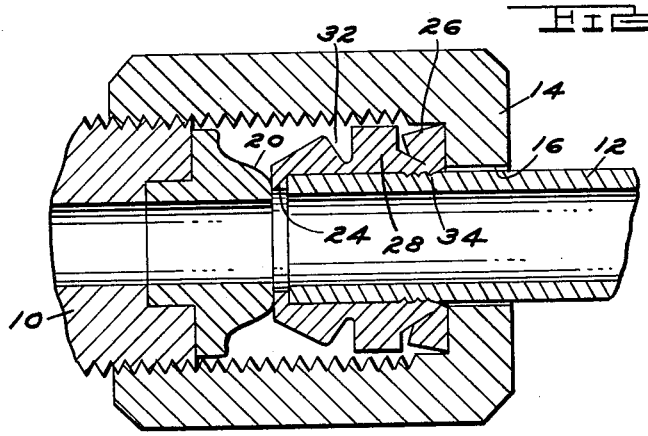
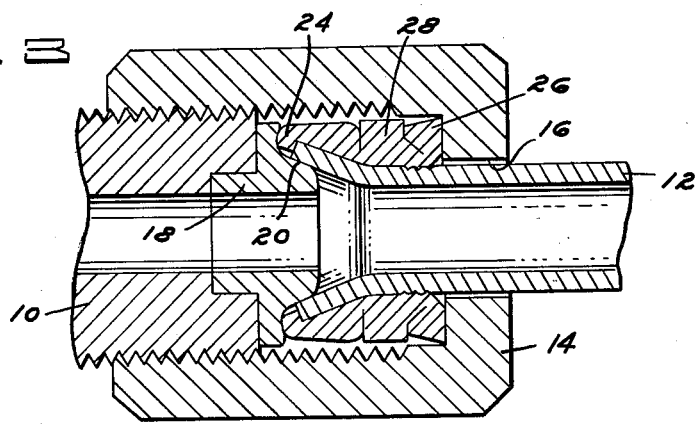
INVENTOR.
VERNON R. CAMPBELL
BY
Burton & Parker
ATTORNEYS

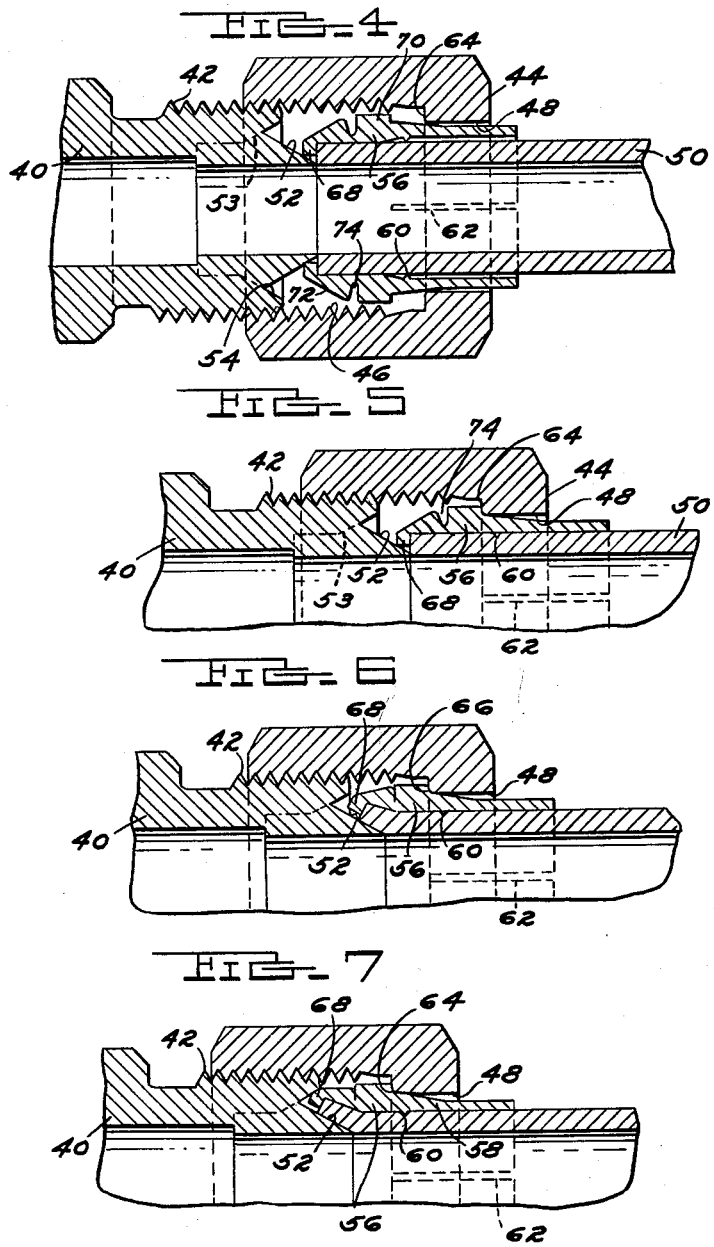

United States Patent Office 3,112,131
Patented Nov. 26, 1963

3,112,131
SELF-FLARING TUBE COUPLING
Vernon R. Campbell, Berkley, Mich., assignor to L & L Manufacturing Company, Warren, Mich., a corporation of Michigan
Filed Oct. 10, 1960, Ser. No. 61,669
8 Claims. (Cl. 285—334.5)

This invention relates to a self-flaring tube assembly or fitting.

An object is to provide a self-flaring tube fitting adapted to be secured to the end of a tube to form an extension thereof or to secure the same to a part with which the tube communicates and which fitting is so constructed that during its securement to the tube, the end of the tube is flared and pinched tightly between cooperating parts of the assembly to provide a fluid-tight seal between the tube and the fitting.

Another object is the provision of a fitting assembly of the character described which is of simple rugged construction and is readily applicable to the end of a tube to be connected therewith and which can be easily assembled thereon by a workman who need not possess unusual skill and wherein such assembly can be made with simple hand tools.

Another object is the provision of a self-flaring tube fitting assembly of the character set forth wherein the parts are so constructed that an unskilled workman can assemble them correctly together to form the connection between the tube and the fitting because the parts are so formed that the only way in which the parts can readily be assembled is the correct way.

A further object of this invention is the provision of a fitting assembly of the character described wherein there is a rotatable nut that is employed to secure the parts together and which nut during its initial rotation constricts a part of the assembly tightly about the tube, and during a further continuance of rotation of the nut, advances the tube toward and against the fitting and flares the end of the tube and forms a tight seal between the tube end portion and the fitting.

A meritorious feature of the fitting assembly is that the end of the tube and the end of the fitting are brought together within a cup-shaped nut and rotation of the nut first constricts a part of the assembly about the tube and then advances the tube toward the fitting and flares the tube and also flares a part of the fitting assembly and wedges the flared end of the tube tightly in place between cooperating parts of the fitting assembly to form a fluid-tight seal therewith.

Other objects, advantages, and meritorious features will more fully appear from the following description, claims and accompanying drawings wherein:

FIG. 1 is a cross-sectional view through one embodiment of the invention showing the parts at the initial stage of assembly.

FIG. 2 is a cross-sectional view similar to that of FIG. 1 except that the nut has been initially tightened upon the fitting and the sleeve portion of the assembly has been constricted about the tube to pick up the tube, but the tube and the sleeve have not been advanced for flaring.

FIG. 3 is a cross-sectional view taken on the same line as FIGS. 1 and 2, showing the parts in the positions they would occupy when the nut has been tightened down upon the fitting and the tube and the fitting are securely connected together.

FIG. 4 is a cross-sectional view taken on the same sectional lines as FIGS. 1 through 3 but showing a modified form of the fitting assembly and showing the same at the initial stage of assembly.

FIG. 5 is a fragmentary sectional view taken on the same line as FIG. 4 through the same embodiment but showing the position of the parts following the initial rotation of the nut which has constricted the sleeve portion of the fitting assembly about the tube but which has not yet resulted in the flaring of the tube.

FIG. 6 is a fragmentary cross-sectional view taken on the same line as FIG. 5 and through the same embodiment showing the tube following its flaring and the establishment of a tight seal between the tube and the fitting and showing a slight modification in structure of the nut as compared with the nut shown in FIGS. 4, 5, and 7.

FIG. 7 is a fragmentary cross-sectional view taken on the same line as FIG. 5 and showing the parts completely assembled together and differing from FIG. 6 in the assembly only in that the sleeve has been bottomed against an undercut bevelled face of the fitting.

In the embodiment shown in the first three figures of the drawing, the externally threaded end of a fitting is indicated as 10. A tube to be connected therewith is indicated as 12. A cup-shaped internally threaded nut is indicated as 14. This nut has an opening 16 through its bottom wall. The end of the tube extends through the opening 16 into the interior of the nut, and the opening 16 is sufficiently oversize the external diameter of the tube to permit free reception of the tube through said opening into the nut. The end of the tube opposed to the fitting is termed its forward end.

The body 10 of the fitting is provided with a nose element 18 secured thereto as shown in FIGS. 1 through 3, by being seated within a counterbore in the fitting. This nose element 18 has a tapered arcuate surface 20 which is opposed to the end of the tube as shown in FIGS. 1 and 2. This tapered surface is adapted to serve as the surface over which the end of the tube is flared as the tube is urged thereagainst, all as shown in FIG. 3.

The fitting assembly includes a sleeve 22 which is mounted upon the tube, encircling the same as shown in FIG. 1. The forward end of the sleeve which is opposed to the fitting is termed the forward end and is provided with a shoulder or flange 24 which overhangs the end of the tube, as shown in FIGS. 1, 2, and 3. This flange prevents the tube from extending through and beyond the end of the sleeve. It also prevents the sleeve from being assembled incorrectly upon the tube and insures that it will be assembled in the proper manner thereupon. The initial position of the parts before they are connected together is shown in FIG. 1.

The sleeve itself, indicated as 22, has a ring-like heel or rear end portion indicated as 26. The sleeve is provided with an intermediate land reinforcing portion 28. Between this heel ring 26 and the land 28 is an encircling weakened channel 30. Forwardly of the land portion 28 is another encircling weakened channel 32. These channels 30 and 32 reduce the thickness of the wall of the body of the sleeve and render the same more readily yieldable at such points. Channel 30 is weakened to the point of the sleeve being contractable about the tube as hereinafter described and as shown in FIGS. 2 and 3. Channel 32 is weakened to the point of providing a line of bend for the flaring outwardly of the end of the tube and the sleeve as hereinafter described and shown in FIG. 3.

FIG. 2 shows the result of the initial tightening of the nut 14 upon the fitting body 10. During this initial tightening the heel ring portion 26 has been rolled over forwardly into the channel 30 and urged radially by virtue of this hinge-like movement to constrict the rear end of the sleeve about the tube. The sleeve is shown adjacent to its rear end as provided with a plurality of internal teeth or threads 34 which are herein illustrated as encircling the sleeve. In this constriction of the rear end of the sleeve about the tube, due to the rolling over of the heel ring 26, these teeth are caused to bite into the tube as shown in FIGS. 2 and 3, picking up the tube so that further rotation of the nut as it advances the sleeve will also advance the tube. The flange 24 and the tooth 34 position the sleeve with respect to the tube so that the sleeve and tube advance as a unit without any relative displacement.

The sleeve is shown undercut at 27, FIGS. 1, 2, and 3, and such provides a weakened line between such undercut and the adjacent portion of the bottom face of the channel 30. The ring-like portion bends or swings about this weakened line and rolls over to the position shown in FIG. 2 and contracts the body of the sleeve about the tube as there illustrated. Such ring-like portion may, however, providing the sleeve is formed of hardened steel or the like, break off so that the ring portion is free along such weakened line from the body of the sleeve and can be urged or swaged up over the tapered bottom face of the channel 30, thereby contracting this rear portion of the sleeve about the tube, causing the teeth 34 to bite into the tube as shown in FIGS. 2 and 3.

The tube is not advanced upon this initial rotation of the nut to accomplish any flaring because the resistance to such advancement of the sleeve and the tube is greater than the resistance of constricting the tail end of the sleeve about the tube. As a result, when the sleeve is advanced by the nut and its flaring is instituted over the arcuate surface of the element 20, the tube also is advanced and flared.

The result of this advancement and the flaring of the tube and sleeve is shown in FIG. 3. It will there be seen that the heel ring 26 has been rolled completely over into the channel 30, filling the same and bearing against the land 28, and the forward portion of the sleeve has been flared outwardly so that the channel 32 has been filled by the outward rearward flaring action. At such time there is a continuous axial pressure line extending from the bottom of the nut through the heel ring 26, land 28, and forward portion of the sleeve. As the sleeve has flared as shown in FIG. 3, the tube also has flared and the flared end of the tube is pinched tightly between the forward end of the sleeve and the bevelled or tapered face of the nose element 18 and forms a tight seal therewith.

In FIGS. 4 through 7 a somewhat modified embodiment is shown. The fitting body is indicated as 40. It is externally threaded at 42. The nut is indicated as 44. It is internally threaded as at 46 to be received upon the body. The bottom of the nut is provided with an opening 48 through which the end of a tube 50 is extended into the interior of the nut. The end of the fitting body which is opposed to the tube is provided with a tapered face 52 directly opposed to the end of the tube. Such end of the fitting body is also provided with an undercut tapered face 54 as shown in FIG. 4.

This tapered face 52 is shown in FIG. 4 as an integral part of the fitting body but it is apparent that the portion which is marked off by a dotted line 53 might be a separate nose element as shown in FIGS. 1 through 3, and that such would present the advantage of permitting this tapered nose portion to be hardened as desired more readily.

The sleeve structure which is identified as 56 differs in detail from the sleeve structure shown in the first three figures of the drawing, but it is designed to react in a generally similar manner in that the initial tightening of the nut constricts the tapered skirt of the sleeve about the tube so that the tooth 60 bites into the tube to pick it up for advancement. A plurality of such teeth may be provided and they may be in the form of threads, as shown in FIGS. 1 through 3.

The skirt of the sleeve is shown as terminating in a portion which extends through the opening 48 in the bottom of the nut and such skirt is shown as slotted as at 62. Such number of slots as may be desired may be provided to facilitate constriction of the sleeve about the tube. It will appear that the initial threading of the nut 44 upon the body of the fitting will advance its shoulder portion 64 (FIG. 7) upon the tapered face 58 of the sleeve and constrict the sleeve about the tube, all as shown in FIGS. 5, 6, and 7.

In FIG. 6 there is a slight modification of this shoulder portion as compared with the shoulder of FIG. 4. In FIG. 4 the shoulder is identified as 64 and is shown as normal to the axis of the fitting. In FIGS. 6 and 7 the shoulder is indicated as 66 and is shown as rounded.

The forward portion of the sleeve 56 is shown as provided with a flange or shoulder part 68 which overhangs the end of the tube. The sleeve has a reinforcing encircling intermediate land part 70 and the nose portion 72 of the sleeve is spaced from such land by a weakened channel 74.

As heretofore set forth in connection with FIGS. 1 through 3, the initial rotation of the nut constricts the skirt of the sleeve about the tube and causes the tooth 60 to bite into the tube so that the tube will be picked up for advancement with the sleeve. The entire skirt portion is constricted about the tube so that the tube is reinforced and stiffened as it extends through the opening at the bottom of the nut.

Once the tube has been picked up by the sleeve as indicated, further rotation of the nut advances the sleeve and tube toward the bevelled face 52 of the body of the fitting and the forward end of the sleeve and tube is caused to flare as it advances over the bevelled face 52 of the fitting. The channel or encircling gap 74 of the sleeve is closed as the forward end portion flares outwardly, all as shown in FIGS. 6 and 7. In FIG. 6 as well as FIG. 7 the sleeve and tube are shown as flared to the point that there is a solid line of thrust from the bottom of the nut through the sleeve against the flared end of the tube which is squeezed tightly between the sleeve and the tapered surface of the fitting so that a tight seal is formed at such point.

What I claim is:

1. A self-flaring tubular fitting assembly comprising, in combination with a tube, a cup-shaped nut having a tube passageway through its bottom and being internally threaded adjacent to its open outer end, said nut received over the end of the tube with the tube extending thereinto through said passageway, a tubular fitting threadedly received within the open end of the nut and having an externally tapered forward nose portion disposed within the nut opposed to the end of the tube and upon which the end of the tube is flared outwardly, said fitting having a radially outwardly extending circumferential stop face at the rearward end of said tapered nose, a sleeve disposed within the nut and encircling the tube, said sleeve having a forward end encircling in juxtaposition the tube with an inwardly extending lip overhanging and abutting the end of the tube and said sleeve having a rear end portion encircling the tube adjacent to the bottom of the nut, said rear end portion being contacted by and being responsive to pressure of the nut thereupon to contract the sleeve about the tube, said sleeve having an internal toothed part adapted to bite into the tube to force the tube to be advanced with the sleeve toward the fitting upon rotation of the nut over the fitting, said sleeve having an encircling weakened portion spaced rearwardly of said forward end defining the rear end of an outwardly flarable forward end portion of the sleeve, the marginal end portion of the tube encircled by said outwardly flarable forward end portion of the sleeve adapted to be flared outwardly within and as the outwardly flarable forward end portion of the sleeve flares outwardly as the tube and sleeve are advanced over the tapered nose portion of the fitting with the flared end portion of the tube wedged between said tapered nose portion of the fitting and the flared forward end portion of the sleeve forming a tight seal between the fitting and the tube, and the forward end of the sleeve abutting said stop to limit axial flaring movement of the sleeve and tube upon the nose of the fitting when the tube is fully flared and sealed upon the nose of the fitting.

2. A self-flaring tubular fitting assembly as defined in claim 1, characterized in that said lip has a radial dimension internally of the sleeve less than the radial thickness of the wall of the tube it overhangs.

3. A self-flaring tubular fitting assembly as defined in claim 1, characterized in that the sleeve has a reinforcing encircling radially projecting rib-like portion disposed immediately rearwardly of said weakened portion with the sleeve bendable about such encircling weakened portion as it is flared outwardly as the tube and sleeve are advanced by the nut over the tapered nose of the fitting.

4. A self-flaring tubular fitting assembly as defined in claim 1, characterized in that said sleeve is provided with an encircling radially projecting ring-like portion adjacent to the bottom of the nut and connected with the body of the sleeve by a weakened line along which it may be broken therefrom and urged upwardly by the nut over the rear end of the sleeve contracting the sleeve about the tube, causing the internal toothed portion of the sleeve to bite into the tube to carry the same along with the sleeve.

5. A self-flaring tubular fitting assembly as defined in claim 1, characterized in that the sleeve has a reinforcing encircling radially projecting rib-like portion disposed intermediate its ends and has an encircling weakened portion in the form of a channel disposed immediately rearwardly of said rib having a bottom wall tapered rearwardly and having a radially projecting rib-like portion rearwardly of the bottom wall of said channel and shiftable into the said channel under pressure of the nut thereon to contract said channel portion of the sleeve about the tube, causing the internal toothed portion of the sleeve to bite into the tube to carry the tube along with the sleeve.

6. A self-flaring tubular fitting assembly as defined in claim 1, characterized in that the sleeve has a reinforcing encircling radially projecting rib-like portion disposed rearwardly of said weakened portion with another encircling weakened portion disposed rearwardly of said rib and contractable about the tube to cause the toothed portion of the sleeve to bite into the tube to advance the tube with the sleeve toward and over the tapered nose of the fitting, and the first mentioned encircling weakened portion that defines the rear end of said outwardly flarable forward end portion of the sleeve and which is disposed forwardly of said rib being yieldable to permit the forward end portion of the sleeve to flare outwardly as the sleeve and tube are urged over the tapered nose of the fitting.

7. The invention as defined in claim 1 characterized in that said stop face extends radially outwardly substantially normal to the axis of the tapered nose of the fitting.

8. The invention as defined in claim 1 characterized in that said stop face extends radially outwardly at an acute angle with respect to the axis of the tapered nose of the fitting to entrap the forward end of the sleeve when the same is in flare-limiting abutment therewith.

References Cited in the file of this patent

UNITED STATES PATENTS

| | | |
|---|---|---|
| 1,889,778 | Dobrick | Dec. 6, 1932 |
| 2,287,889 | Krumsiek | June 30, 1942 |
| 2,497,273 | Richardson | Feb. 14, 1950 |
| 2,930,635 | Woodling | Mar. 29, 1960 |

FOREIGN PATENTS

| | | |
|---|---|---|
| 813,715 | Great Britain | May 21, 1959 |